United States Patent
Chen et al.

(10) Patent No.: US 7,408,849 B2
(45) Date of Patent: Aug. 5, 2008

(54) TILT ADJUSTMENT DEVICE FOR AN OPTICAL DISK DRIVE

(75) Inventors: Jeng-Jiun Chen, Hsinchu (TW);
Bor-Ruey Chen, Hsinchu (TW);
Chih-Chung Hsieh, Hsinchu (TW);
Hui-Chung Leu, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 685 days.

(21) Appl. No.: 11/142,401

(22) Filed: Jun. 2, 2005

(65) Prior Publication Data

US 2005/0270923 A1  Dec. 8, 2005

(30) Foreign Application Priority Data

Jun. 4, 2004  (TW)  ............................... 93116157 A

(51) Int. Cl.
*G11B 7/00* (2006.01)
(52) U.S. Cl. .................. 369/44.32; 720/675; 369/53.19
(58) Field of Classification Search .............. 369/44.32, 369/53.19, 44.28
See application file for complete search history.

(56) References Cited

U.S. PATENT DOCUMENTS

| | | | | |
|---|---|---|---|---|
| 5,768,248 A * | 6/1998 | Lee | ............................. | 720/675 |
| 5,995,478 A * | 11/1999 | Park | ............................. | 720/675 |
| 6,754,154 B1 * | 6/2004 | Takeda et al. | ............. | 369/53.19 |
| 6,813,772 B2 * | 11/2004 | Ariyoshi | ..................... | 720/600 |
| 6,993,825 B2 * | 2/2006 | Hikake et al. | .............. | 29/603.1 |
| 2003/0133397 A1 * | 7/2003 | Nagatsuka | .................. | 369/223 |

* cited by examiner

*Primary Examiner*—Wayne Young
*Assistant Examiner*—Van T Pham
(74) *Attorney, Agent, or Firm*—Ming Chow; Sinorica, LLC

(57) ABSTRACT

A tilt adjustment device for adjusting tilt of a left guide bar with respect to a right guide bar, and includes a holding seat and a cylindrical-shaped bushing disposed rotatably within the holding seat. The bushing defines a bar-retention hole to permit extension of the left guide bar therethrough, and has a turning portion defining a first axis and an insert portion that extends eccentrically from the turning portion and that defines a second axis parallel to the first axis. Rotation of the cylindrical-shaped bushing relative to the holding seat results in a radial movement of the turning portion, which, in turn, moves the first axis toward and away from the second axis of the insert portion.

14 Claims, 5 Drawing Sheets

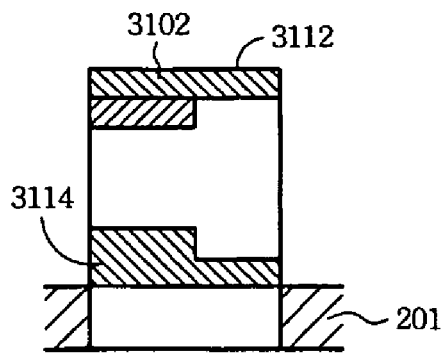
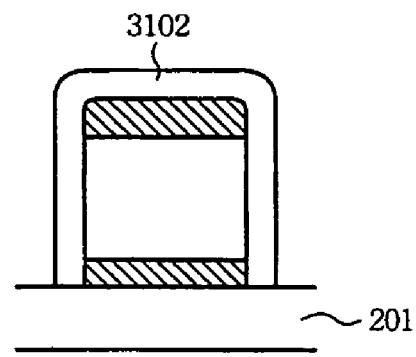
Fig.7A  Fig.7B
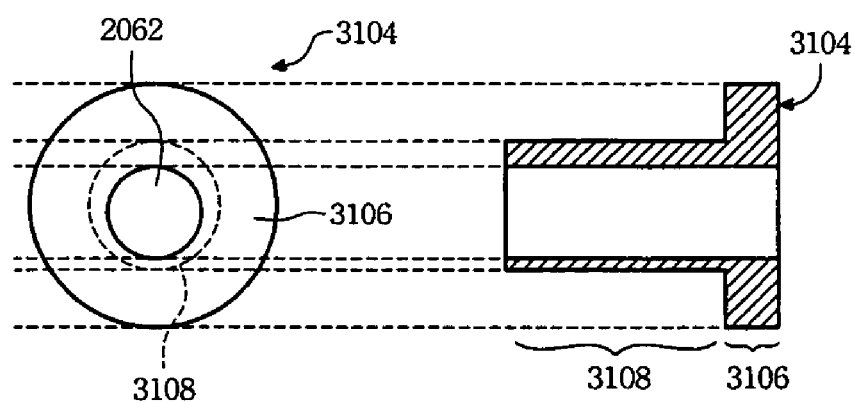
Fig.8A  Fig.8B

TILT ADJUSTMENT DEVICE FOR AN OPTICAL DISK DRIVE

FIELD OF THE INVENTION

The present invention relates to a tilt adjustment device, more particularly to a tilt adjustment device for adjusting tilt of a left guide bar with respect to a right guide bar of an optical disk drive.

BACKGROUND OF THE INVENTION

Among all the data storage solutions, the optical disks are becoming more and more important for backing up data and exchanging information because the optical disks have many advantages including a high storage capacity, easy to handle and carry, and a long preserving time for the stored data. Till now, the optical disk drives can be found all around us, such as in desktop computers, laptop computers, DVD players, and even some instruments or electronic products with built-in microprocessors.

Referring to FIG. 1, a conventional optical disk drive 10 is shown to include a spindle motor 104, a disk loader (not visible) mounted on the spindle motor 104, an optical disk (not shown) mounted on the disk loader so as to be rotated by the spindle motor 10, left and right guide bars 106, 108, a carriage seat 105 mounted slidably on the left and right guide bars 106, 108, and a pick-up head 102 mounted on the carriage seat 105. The carriage seat 105 is movable on the left and right guide bars 106, 108 upon actuation of a sled motor (not shown), which in turn, causes the pick-up head 102 to move reciprocally on the left and right guide bars 106, 108. The pick-up head 102 is provided with a voice coil motor (not shown), which cooperates with the sled motor to enable the pick-up head 102 to move along a vertical direction downward and upward in order to precisely focus the laser beam on a recording surface of the optical disk, thereby permitting reading operation of the data from the optical disk.

In order to reproduce the data recorded on the disk properly, the head 102 must move radially in a straight line from the center of the disk and the plane of the disk and the plane of movement of the head 102 along the guide bars 106, 108 should be parallel. However, the head 102 may deviate from the radial path from the disk center or is tilted with respect to the plane of the disk due to manufacturing errors. Under such circumstance, the head 102 fails to provide precise focusing and tracking of the disk.

U.S. Pat. No. 5,768,248 to Hyun-woo Lee has proposed a pick-up position and tilt adjusting apparatus for a disk player. However, the aforesaid tilt apparatus includes several complicated parts for adjusting the elevation of the left and right guide bars, thereby resulting in high manufacture cost.

SUMMARY OF THE INVENTION

The object of the present invention is to provide a tilt adjustment device for adjusting tilt of a left guide bar with respect to a right guide bar of an optical disk drive. The tilt adjustment device includes components of simple structure so as to overcome the disadvantages of the conventional optical disk drive.

In one aspect of the present invention, a tilt adjustment device for adjusting tilt of a left guide bar with respect to a right guide bar in order to dispose the left and right guide bars in the same elevation, the tilt adjustment device includes: a holding seat; and a cylindrical-shaped bushing disposed rotatably within the holding seat, defining a bar-retention hole adapted to permit extension of the left guide bar therethrough, the cylindrical-shaped bushing having a turning portion defining a first axis and an insert portion that extends eccentrically from the turning portion and that defines a second axis parallel to the first axis. Rotation of the cylindrical-shaped bushing relative to the holding seat results in a radial movement of the turning portion, which, in turn, moves the first axis toward and away from the second axis of the insert portion.

In anther aspect of the present invention, a tilt adjustment device for adjusting tilt of a left guide bar with respect to a right guide bar in order to dispose the left and right guide bars in the same elevation, the tilt adjustment device includes: a base member; a holding seat mounted stationarily on the base member and having a rear portion formed with a bushing-retention hole therethrough; a cylindrical-shaped bushing defining a bar-retention hole adapted to permit extension of the left guide bar therethrough, the cylindrical-shaped bushing having a turning portion defining a first axis, and an insert portion that extends eccentrically from the turning portion and that defines a second axis parallel with the first axis, the insert portion of the cylindrical-shaped bushing being disposed rotatably within the bushing-retention hole in the holding seat. Rotation of the insert portion of the cylindrical-shaped bushing relative to the holding seat results in a radial movement of the turning portion, which, in turn, moves the first axis toward and away from the second axis of the insert portion.

BRIEF DESCRIPTION OF THE DRAWINGS

Other features and advantages of this invention will become more apparent in the following detailed description of the preferred embodiments of this invention, with reference to the accompanying drawings, in which:

FIGS. 6A and 4B respectively show side cross-sectional and front views of a modified tilt adjustment device employed in the optical disk drive of the present invention;

FIGS. 7A and 7B respectively show side cross-sectional and front views of a holding seat of the modified adjustment device employed in the optical disk drive of the present invention; and FIGS. 8A and 8B respectively show side cross-sectional and front views of a cylindrical-shaped bushing of the modified adjustment device employed in the optical disk drive of the present invention;

DETAILED DESCCRIPTIONS OF THE PREFERRED EMBODIMENTS

Figure 1:
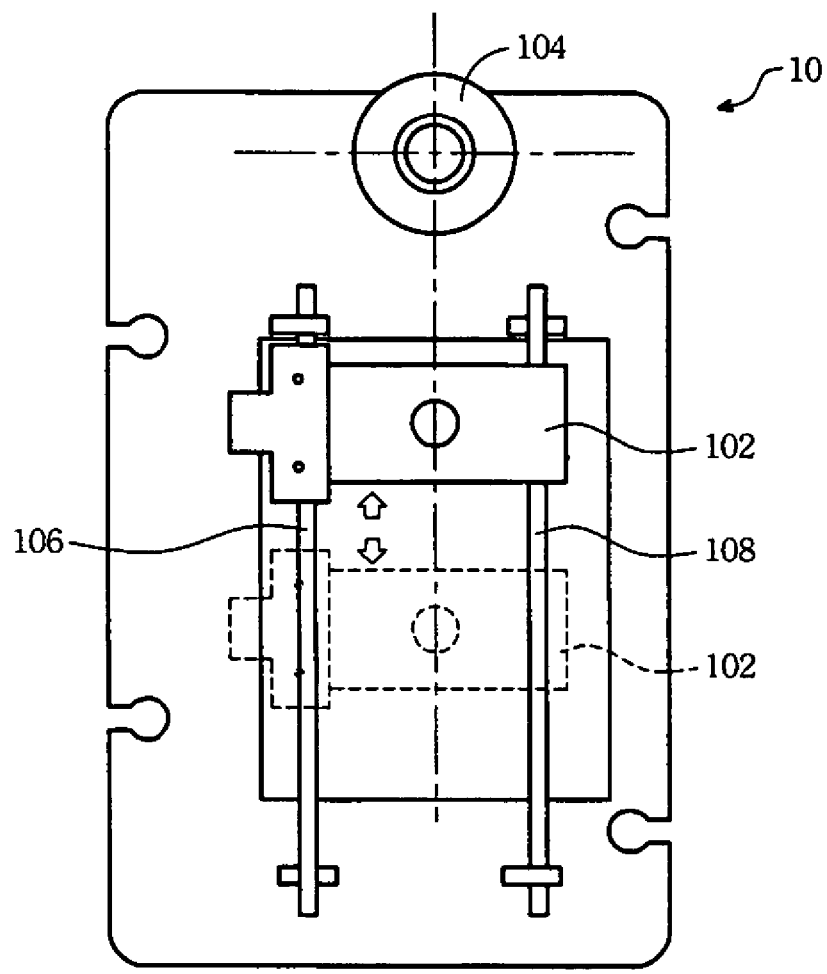
FIG. 1 is top planar view, illustrating how a pick-up head is mounted on left and right guide bars of a conventional optical disk drive.
Figure 2:
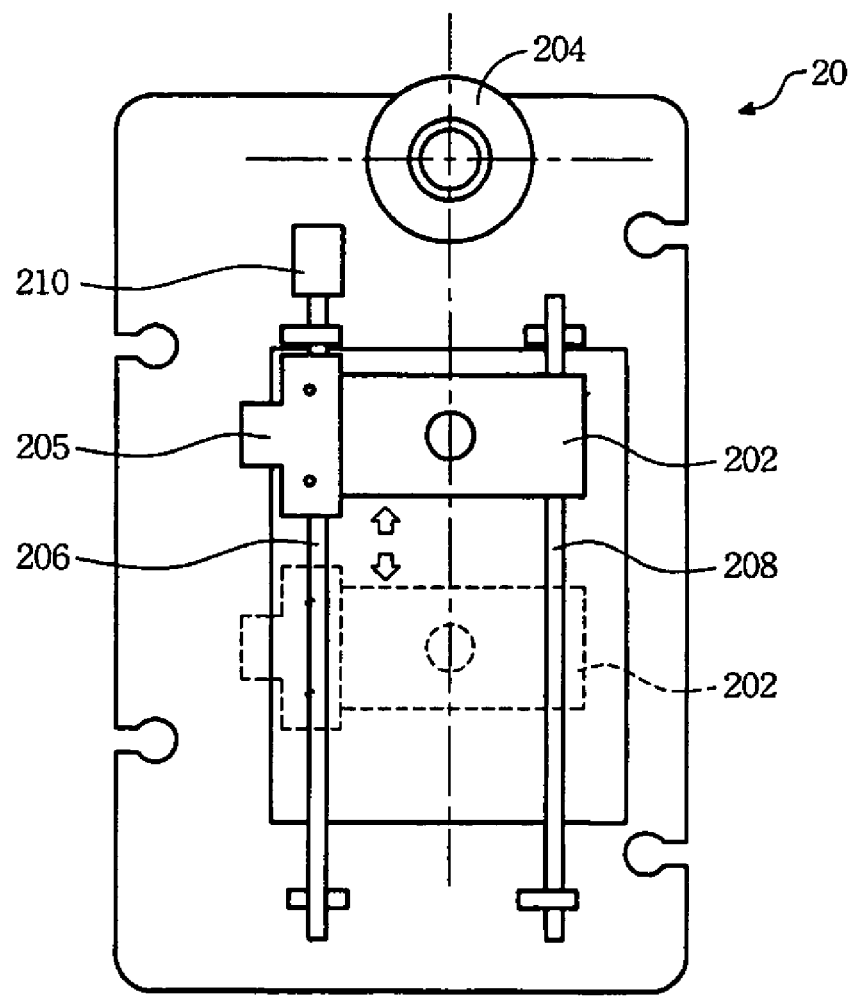
FIG. 2 is top planar view, illustrating how a pick-up head is mounted on left and right guide bars of an optical disk drive of the present invention.
Figures 3A, 3B:
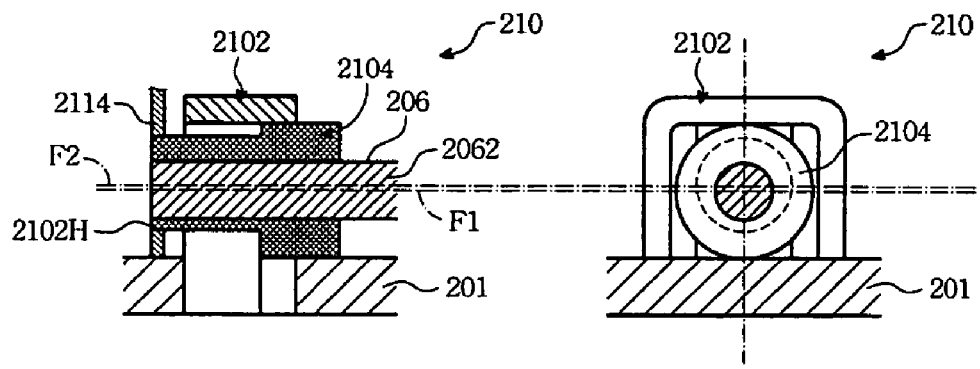
FIGS. 3A and 3B respectively show side cross-sectional and front views of a tilt adjustment device employed in the optical disk drive of the present invention.
Figures 4A, 4B:
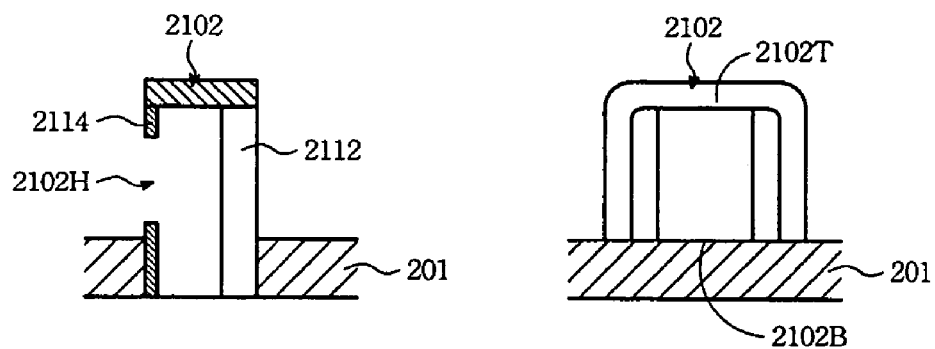
FIGS. 4A and 4B respectively show side cross-sectional and front views of a holding seat of the tilt adjustment device employed in the optical disk drive of the present invention.

Referring to FIG. 2, a top planar view of an optical disk drive 20 of the present invention is shown to include a spindle motor 204, a disk loader (not visible) mounted on the spindle motor 204, an optical disk (not shown) mounted on the disk loader so as to be rotated by the spindle motor 204, parallel left and right guide bars 206, 208, a pick-up head 202 mounted slidably on the left and right guide bars 206, 208 via a carriage seat 205, and a tilt adjustment device 210 (see FIGS. 3A and 3B). The carriage seat 205 is movable on the left and right guide bars 206, 208 upon actuation of a sled motor (not shown). A voice coil motor (not visible) is disposed below the carriage seat 205 for moving the latter horizontally and vertically relative to the left and right guide bars 206, 208 during the reading or recording operation of the optical disk. A laser diode (not visible) is provided on the carriage seat 205 in such a manner to emit laser beams onto an optical disk (not shown) along a predetermined angle in order to read the data on the optical disk or for recording data onto the optical disk. Since the structure of the pick-up head 202 is not the relevant feature of the present invention, a detailed description thereof is omitted herein for the sake of brevity.

Referring to FIGS. 3A to 5B, the tilt adjustment device 210 includes a base member 201 (generally the outer casing of the optical disk drive 20), a holding seat 2102, and a cylindrical-shaped bushing 2104. The holding seat 2102 is mounted stationarily on the base member 201, and has a rear portion 2114 (see FIGS. 3A and 4A) formed with a bushing-retention hole 2102H, and a front portion 2112 (see FIGS. 3A and 4A) defining top and bottom sides 2102T, 2102B (see FIG. 4B). The cylindrical-shaped bushing 2104 has a rear insert portion 2108 mounted rotatably within the bushing-retention hole 2102H of the holding seat 2102, and a front turning portion 2106 that cooperates with the insert portion 2108 to define a bar-retention hole therethrough such that after assembly, a portion 2062 of the left guide bar 206 extends through the bar-retention hole in the bushing 2104 (see FIG. 3A).

Figures 5A, 5B:
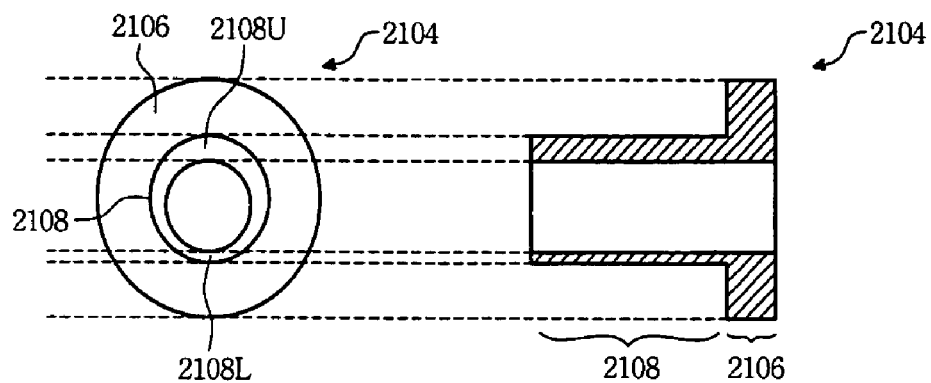
FIGS. 5A and 5B respectively show side cross-sectional and front views of a cylindrical-shaped bushing of the tilt adjustment device employed in the optical disk drive of the present invention.
Figures 6A, 6B:
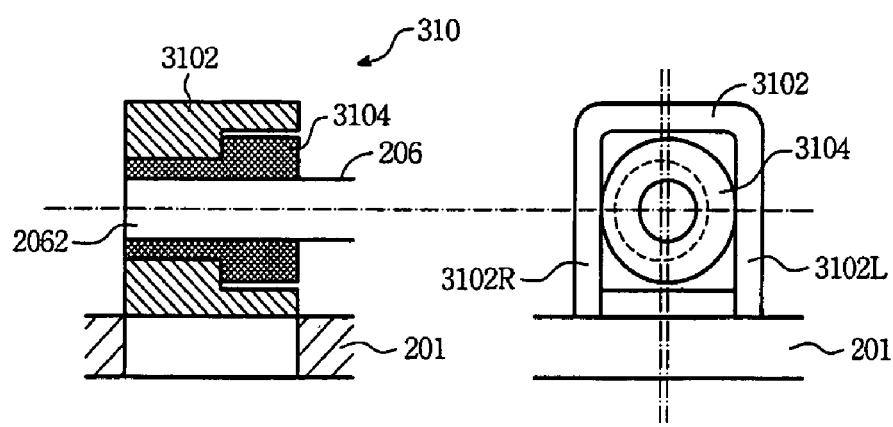

An important aspect to note that the turning portion 2106 of the bushing 2104 is confined by a first wall section having uniform thickness through an axial length thereof (see FIG. 5B). The insert portion 2108 is constricted with respect to the turning portion 2106 and is confined by a second wall section having an upper side 2108U, a lower side 2108L opposite to the upper side 2108U, and a wall thickness which gradually reduces from the upper side 2108U toward the lower side 2108L through out a longitudinal length thereof. Under this condition, the turning portion 2106 defines a first axis F1 while the insert portion 2108 extends eccentrically from the turning portion 2106 to defines a second axis F2 parallel to the first axis F1. In other words, the turning portion 2106 of the bushing 2104 is disposed concentric with the left guide bar 206 while the insert portion 2108 of the cylindrical-shaped bushing 2104 is disposed eccentric with the left guide bar 206. The periphery of the turning portion 2106 of the bushing 2104 contacts slidably the top and bottom sides 2102T, 2102B of the front portion 2112 of the holding seat 2102 such that movement of the turning portion 2106 in the vertical direction is restricted. In this embodiment, the base member 201 serves as the bottom side 2102B of the holding seat 2102.

In the event, the user of the disk drive 20 of the present invention observes a tilt of the left guide bar 206 with respect to the right guide bar 208 (i.e. the left and right guide bars 206, 208 are not in the same elevation, which may lead to indefinite focusing and tracking of the laser beams on the optical disk, which, in turn, results in inaccuracy of the reading and/or writing operations. In order to adjust and correct the tilt position of the pick-up head 202 (i.e. the left guide bar 206) with respect to the right guide bar 208, he can turn manually or mechanically the bushing 2104 relative to the holding seat 2102. Since the insertion portion 2108 is confined rotatably within the hole 2102H of the holding seat 2102, rotation of the bushing 2104 relative to the holding seat 2102 results in a radial movement of the turning portion 2106, which, in turn, moves the first axis F1 of the turning portion 2106 toward and away from the second axis F2 of the insert portion 2108. In fact, the radial movement is in the in a left-and-right direction. Note that movement of the turning portion 2106 in the left-and-right direction results in an angular displacement of the left guide bar 206, thereby causing an elevation change of the left guide bar 206 so as to dispose the left and right guide bars 206, 208 in the same elevation.

Referring to FIGS. 6A to 8B, a modified tilt adjustment device 310 of the optical disk drive according to the present invention is shown to have a construction similar to the previous embodiment. The main difference resides in the holding seat 3102 has a front portion 3112 defining left and right sides 3102L, 3102R slidably contacting the periphery of the turning portion 3106 of the bushing 3104 so as to restrict movement of the same in the-left-and-right direction. Under this condition, during the tilt adjusting operation, rotation of the bushing 3102 relative to the holding seat 3102 results in movement of the turning portion 3106 in an up-and-down direction (i.e. along the vertical direction) defining the radial movement. Radial movement of the turning portion 3106 with respect to the holding seat 3102 results in an angular displacement of the left guide bar 206 so as to dispose the left and right guide bars 206 in the same elevation.

As disclosed above, the tilt adjustment device used in the disk drive of the present invention simple in construction but effective in adjusting tilt of the left guide bar with respect to the right guide bar. The object is thus achieved.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A tilt adjustment device for adjusting tilt of a left guide bar with respect to a right guide bar in order to dispose the left and right guide bars in the same elevation, the tilt adjustment device comprising:
   a holding seat; and
   a cylindrical-shaped bushing disposed rotatably within said holding seat, defining a bar-retention hole adapted to permit extension of the left guide bar therethrough, said cylindrical-shaped bushing having a turning portion defining a first axis, and an insert portion that extends eccentrically from said turning portion and that defines a second axis parallel to said first axis;
   wherein, rotation of said cylindrical-shaped bushing relative to said holding seat results in a radial movement of said turning portion, which, in turn, moves said first axis toward and away from said second axis of said insert portion.

2. The tilt adjustment device according to claim 1, wherein said holding seat has a rear portion formed with a bushing-retention hole therethrough, said insert portion of said cylindrical-shaped bushing being disposed rotatably within said bushing-retention hole.

3. The tilt adjustment device according to claim 2, wherein said holding seat has a front portion defining top and bottom sides slidably contacting a periphery of said turning portion of said cylindrical-shaped bushing, thereby permitting movement of said turning portion with respect to said holding seat in a left-and-right direction defining said radial movement.

4. The tilt adjustment device according to claim 2, wherein said holding seat has a front portion defining left and right sides slidably contacting a periphery of said turning portion of said cylindrical-shaped bushing, thereby permitting movement of said turning portion in an up-and-down direction defining said radial movement.

5. The tilt adjustment device according to claim 1, further comprising a base member, said holding seat being mounted stationarily on said base member.

6. The tilt adjustment device according to claim 1, wherein said turning portion of said cylindrical-shaped bushing is disposed concentric with the left guide bar, said insert portion of said cylindrical-shaped bushing being disposed eccentric with the left guide bar.

7. The tilt adjustment device according to claim 1, wherein said turning portion of said cylindrical-shaped bushing is confined by a first wall section having uniform thickness through an axial length thereof, said insert portion being constricted with respect to said turning portion and being confined by a second wall section having an upper side, a lower side opposite to said upper side, and a wall thickness which gradually reduces from said upper side toward said lower side through out a longitudinal length thereof.

8. The tilt adjustment device according to claim 1, wherein said radial movement of said turning portion is transverse to each of said first and second axes of said turning and insert portions.

9. A tilt adjustment device for adjusting tilt of a left guide bar with respect to a right guide bar in order to dispose the left and right guide bars in the same elevation, the tilt adjustment device comprising:
  a base member;
  a holding seat mounted stationarily on said base member, and having a rear portion formed with a bushing-retention hole therethrough;
  a cylindrical-shaped bushing defining a bar-retention hole adapted to permit extension of the left guide bar therethrough, said cylindrical-shaped bushing having a turning portion defining a first axis, and an insert portion that extends eccentrically from said turning portion and that defines a second axis parallel with said first axis, said insert portion of said cylindrical-shaped bushing being disposed rotatably within said bushing-retention hole in said holding seat;
  wherein, rotation of said insert portion of said cylindrical-shaped bushing relative to said holding seat results in a radial movement of said turning portion, which, in turn, moves said first axis of said turning portion toward and away from said second axis of said insert portion.

10. The tilt adjustment device according to claim 9, wherein said turning portion of said cylindrical-shaped bushing is disposed concentric with the left guide bar, said insert portion of said cylindrical-shaped bushing being disposed eccentric with the left guide bar.

11. The tilt adjustment device according to claim 9, wherein said turning portion of said cylindrical-shaped bushing is confined by a first wall section having uniform thickness through an axial length thereof, said insert portion being constricted with respect to said turning portion and being confined by a second wall section having an upper side, a lower side opposite to said upper side, and a wall thickness which gradually reduces from said upper side toward said lower side.

12. The tilt adjustment device according to claim 9, wherein said radial movement of said turning portion is transverse to each of said first and second axes of said first and insert portions.

13. The tilt adjustment device according to claim 9, wherein said holding seat has a front portion defining top and bottom sides slidably contacting a periphery of said turning portion of said cylindrical-shaped bushing, thereby permitting movement of said turning portion with respect to said holding seat in a left-and-right direction defining said radial movement.

14. The tilt adjustment device according to claim 9, wherein said holding seat has a front portion defining left and right sides slidably contacting a periphery of said turning portion of said cylindrical-shaped bushing, thereby permitting movement of said turning portion in an up-and-down direction defining said radial movement.

* * * * *